W. C. FISCHER.
INCUBATOR AND BROODER.
APPLICATION FILED MAY 3, 1912.

1,103,189.

Patented July 14, 1914.

WITNESSES:
Eva L. Stoughton
Lorris Lucia

INVENTOR.
William C. Fischer.
BY
Arthur B. Jenkins
ATTORNEY.

UNITED STATES PATENT OFFICE.

WILLIAM C. FISCHER, OF PHOENIXVILLE, CONNECTICUT.

INCUBATOR AND BROODER.

1,103,189.  Specification of Letters Patent.  Patented July 14, 1914.

Application filed May 3, 1912. Serial No. 694,851.

*To all whom it may concern:*

Be it known that I, WILLIAM C. FISCHER, a citizen of the United States, and a resident of Phoenixville, in the county of Windham and State of Connecticut, have invented a new and Improved Incubator and Brooder, of which the following is a specification.

My invention relates to the class of devices above named and an object of the invention, among others, is to provide a device of this class in the use of which the purity of the air may be regulated and the air and heat so tempered as to produce extremely efficient results.

One form of device embodying the invention and in the construction and use of which the object above set out, as well as others, may be attained is illustrated in the accompanying drawings, in which—

Figure 1:
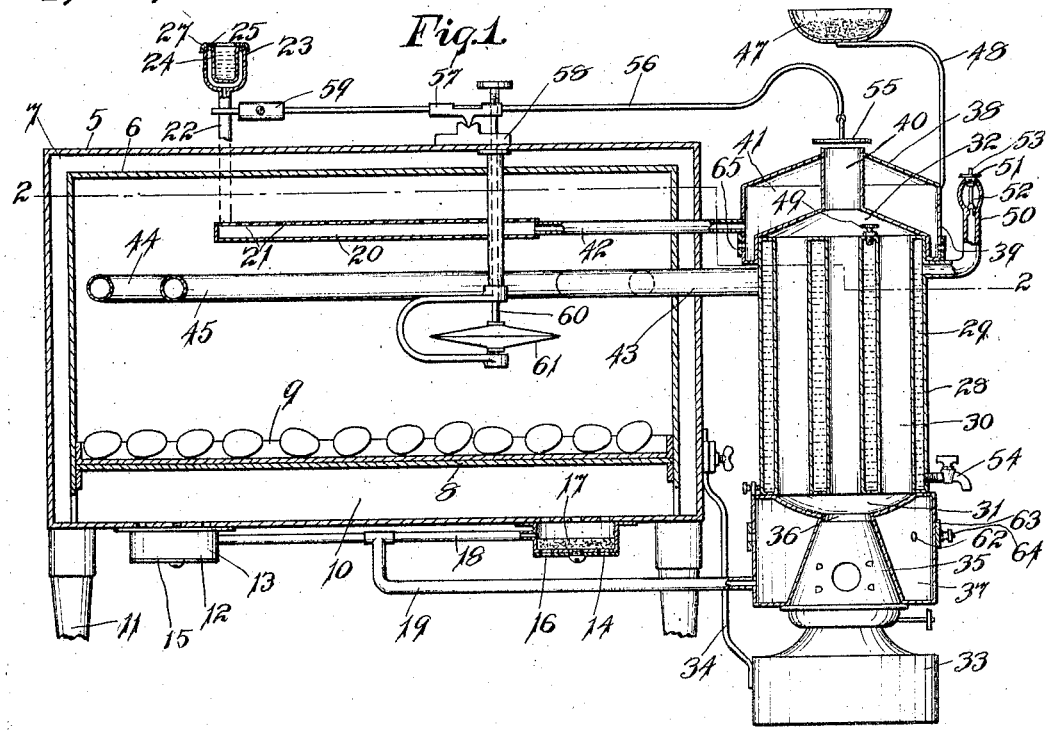
Figure 2:
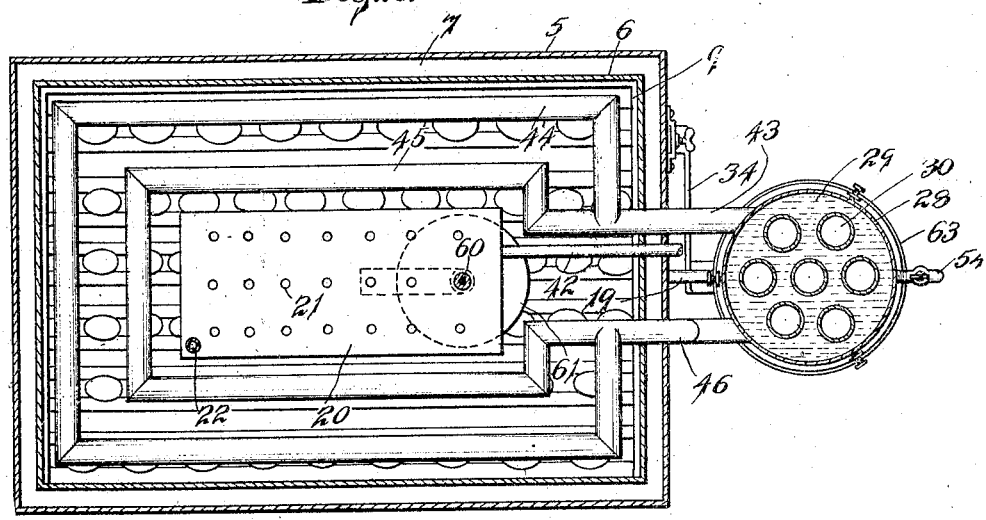

Figure 1 is a view in central vertical section through an incubator embodying my invention. Fig. 2 is a view in horizontal section on plane denoted by dotted line 2—2 of Fig. 1.

While the case embodying the incubator may be of any desired form and construction I prefer to make it with an outer wall 5 and an inner wall 6, providing an air space 7. A series of slats 8 form the bottom of the egg chamber and an egg tray 9 is located on these slats, this tray being of the usual form and construction consisting of slats upon which the eggs may rest and between some of which the chickens may drop into the compartment 10 at the bottom of the case, the openings between the slats 8 being large enough for this purpose. Any means of supporting the case may be employed, legs 11 being illustrated herein for that purpose.

Mixers 12 are secured underneath the bottom of the case, any suitable number of which may be employed, two being shown herein. These mixers each consist of a cup 13 secured to the bottom of the case and having inlet openings 14 through the bottom of the cup. A disk 15 is rotatably secured to the bottom of each cup outside thereof, these disks having openings 16 arranged to register with the openings 14 when the disk is in one position so that air may pass into the cup through a shield 17. This shield will be composed of any suitable porous material which will prevent fresh air from passing in too great a quantity into the chamber 10. By rotating the disks 15 the openings therthrough and through the bottom of the cups are moved out of register so that no fresh air may pass into the cups, or the amount which will pass into the cups may be regulated. An inlet pipe 18 supplies air to each of the mixers from a supply pipe 19 so connected to the inlet pipes that the supply and flow will be uniform to all of the mixers.

A distributing box 20 is located in the upper part of the egg chamber, this distributing box having openings 21 and an outlet pipe 22 extending through the top of the case. An evaporating cup 23 is secured to the top of the outlet pipe, this evaporating cup having double walls forming a chamber 24 with outlet openings 25 therefrom, which may be formed through the wall of the cup into the chamber 24 and these openings are controlled as by a ring 27 having openings to register with the openings 25 in one position of the ring, but closing said openings when the ring is rotated to another position.

A heater 28 is located at one side of the case and is supported thereby in any suitable manner. This heater consists of a boiler having a water chamber 29 with flues 30 extending upward through the water chamber from a heating chamber 31 and into an outlet chamber 32. The heater may include a lamp 33 suspended as by a bracket 34 from the case and having a chimney 35 projecting into a main flue 36. A hot air chamber 37 is formed in the base of the heater, the supply pipe 19 hereinbefore described conducting air from this hot air chamber. A hollow cap 38 is located on top of the boiler, this cap having a flange 39 surrounding the upper part of the boiler and the space within this flange being of dome shape to constitute the outlet chamber 32 from which an outlet flue 40 extends to the atmosphere. The chamber within the hollow cap constitutes a distributing hot air chamber 41 from which a distributing pipe 42 conveys hot air to the distributing box 20. Circulating pipes extend from the boiler within the case, these consisting of a lead 43 extending from the boiler into the case and having two branches constituting an outer coil 44 and an inner coil 45 each connected with the return 46 to the boiler, which return drops, outside of the case, before it enters into the boiler, as shown in Fig. 2 of the drawings. A second evaporating cup 47 is located over the flue 40, being supported as by a bracket 48. The waste heat passing from the heater is thus utilized for evaporation purposes, the cup being filled with moist sand, water, or any other suitable moist material. Both of the cups 23 and 47 are thus, by the use of waste heat, operated to provide the room within which the incubator is located with the proper degree of moisture.

Any suitable means for venting the boiler when it is being filled may be employed, as herein shown a vent screw 49 extending into the top of the boiler, as shown in Fig. 1.

A filling tube 50 is used for filling the boiler, this having a removable cap 51 in which a pressure valve 52 is located, this valve being located on a valve rod 53 loosely mounted in the cap, and by means of which the pressure, if any, within the boiler may be controlled. A faucet 54 may be used to draw the water from the boiler.

Any suitable form of device for regulating the heat may be employed; as herein shown a damper 55 supported on a rod 56 overlying the outlet flue 40 controls the flow of air therethrough. This rod may be supported on a rocker 57 mounted on a base 58 on the top of the case. A weight 59 is supported on the other end of the rod and an actuating rod 60 is connected with the rocker 57, the lower end of the rod being secured to a thermostat 61 of any suitable form and construction, and the operation of which, by expansion or contraction, under the influence of the atmosphere, will cause the rod 56 to be moved to operate the damper.

The wall of the hot air chamber 37 has a number of openings 62 and a damper consisting of a band 63 surrounds the chamber and has a number of openings to register with the openings therethrough, so that by turning the band as by means of a knob 64 the openings may be caused to register to admit air, or may be moved out of register to stop the flow of air, or may be so positioned as to supply the air in any desired amount. A similar regulator consisting of a band 65 is employed in connection with the distributing hot air chamber 41.

While I have shown and described herein one form of device embodying my invention that operates satisfactorily this may be departed from to a greater or lesser extent and yet embody the invention.

I claim—

1. In an incubator, a case, a heating device, a hot air chamber surrounding said heating device and completely shut off from the latter, means for supplying air to said chamber, means for conducting air from said chamber to the interior of the case, a boiler separately formed from said hot air chamber and removably resting thereon and having flues to conduct the heat from said heating device, and a coil extending from said boiler to the interior of the case.

2. In an incubator, a case, a heating device, a hot air chamber surrounding said heating device and completely shut off therefrom, means for supplying air to said chamber, means for conducting said air to the interior of the case at the bottom thereof, a second heating chamber removably located above the first and having a flue to conduct the heat from said heating device, means for supplying air to said second heating chamber independently of the heating device or first heating chamber, and means for conducting said air to the interior of the case at the upper part thereof.

3. In an incubator, a case, a heating device having a heating chamber, a boiler separately formed from the heating device and removably located thereon and having flues to receive the heat from said heating chamber, a coil extending from said boiler within the case, a hot air chamber separately formed from the boiler and removably located thereon and having a flue to conduct air from said boiler flues, said hot air chamber being completely shut off from said heating device, means for supplying air to said hot air chamber, and means for conducting the air from said hot air chamber to the upper part of said case.

4. In an incubator, a case, a heating device, a hot air chamber surrounding said heating device and completely shut off therefrom, means for conducting the air into said chamber and to the bottom of the case, a boiler overlying said hot air chamber and having flues to conduct the air from said heating device, a coil extending from said boiler within the case, a second hot air chamber overlying the boiler and having a flue to conduct the hot air from the boiler flues, said hot air chamber being completely cut off from the heating device, and means for supplying the second hot air chamber with air and for conducting it to said case.

5. In an incubator, a case, a heating device, a hot air chamber surrounding said heating device and completely shut off therefrom, said chamber comprising a unitary structure separate and distinct from the heater, means for conducting air to the hot air chamber and from thence to the case, a boiler forming a unitary structure removably located upon said hot air chamber and having flues communicating with the heating device, a coil extending from the boiler into the case, a second hot air chamber constituting a unitary structure removably seated upon the boiler and completely shut off from the heating device, and means for supplying air to the second heating chamber and for conducting it therefrom to the top of the case.

6. In an incubator, a case, a heating device, a hot air chamber completely shut off from the heating device and having a central opening to receive the latter and a flaring outlet therefrom, means for supplying air to the hot air chamber and from thence to the case at the bottom thereof, a boiler separately formed from said hot air chamber and resting thereon and having flues opening out from said flaring outlet, a coil extending from the boiler into the case, a second hot air chamber separately formed and removably located upon the boiler and having a flaring chamber overlying the flues from the boiler and with a central flue leading from said flaring chamber, the hot air chamber being completely cut off from the heating device, and means for supplying air to the second heating chamber and for conducting it from thence to the top of the case.

7. In an incubator, a case, a heating device, a hot air chamber completely shut off from the heating device and formed as a unitary structure, means for conducting the air to said hot air chamber and from thence to the bottom of the case, a boiler removably located upon the hot air chamber and having flues to conduct heat from the heating device, a coil extending from the boiler into the case, a second hot air chamber formed as a unitary structure and constituting a cap for the boiler and comprising a flange surrounding the upper part of the boiler, said second hot air chamber being completely shut off from the heating device and having a flue to conduct the air passing through the flues to the boiler, and means for supplying air to said second hot air chamber and from thence to the upper part of the case.

WILLIAM C. FISCHER

Witnesses:
 ARTHUR B. JENKINS,
 EVA L. STOUGHTON.